May 22, 1973
A. B. SMALL ET AL
3,734,811
LAMINATED CONSTRUCTION OF CELLULAR PLASTIC MATERIAL
Original Filed July 12, 1967
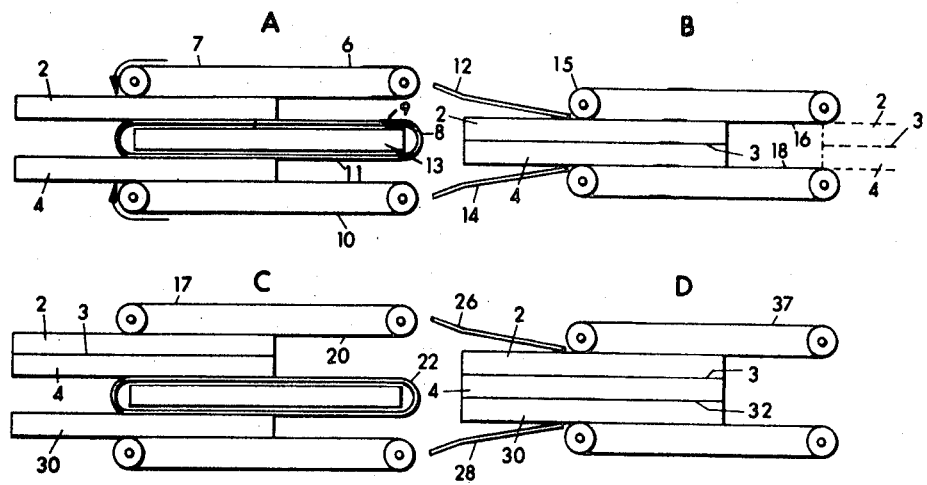
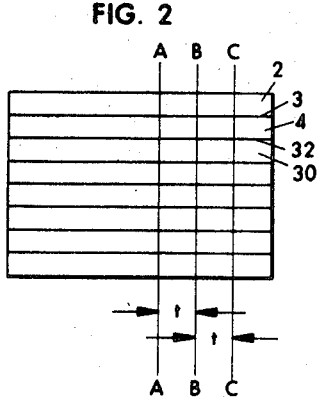
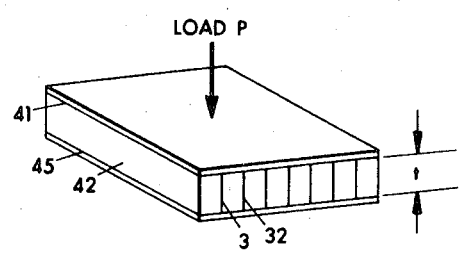
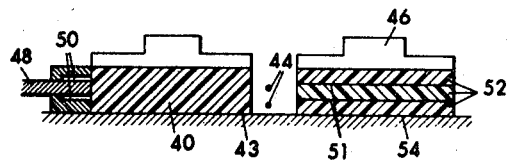

3,734,811
LAMINATED CONSTRUCTION OF CELLULAR PLASTIC MATERIAL

Augustus B. Small, Brussels, Belgium, Paul T. Gorman, Arenzano, Italy, and Frederick J. McGarry, Weston, Mass., assignors to Esso Research and Engineering Company, Linden, N.J.
Original application July 12, 1967, Ser. No. 652,748, now Patent No. 3,607,531. Divided and this application Oct. 29, 1970, Ser. No. 85,236
Int. Cl. B32b *3/10, 5/18;* B65d *25/14*
U.S. Cl. 161—37                                              4 Claims

ABSTRACT OF THE DISCLOSURE

According to the teachings of the instant invention, a high-strength cellular plastic insulation system comprised of alternating layers of cellular plastic and thin columns of solid plastic is formed by heat sealing blocks of the cellular plastic together. The resulting product, while retaining its high insulation efficiency, has greatly improved compressive strength and increased fatigue resistance.

CROSS REFERENCE TO RELATED APPLICATIONS

This is a divisional of application Ser. No. 652,748, filed July 12, 1967, now U.S. Pat. 3,607,531.

BACKGROUND OF THE INVENTION

This invention relates generally to insulation systems and more particularly to an insulation material to be useful in systems for the storage and transportation of various liquids throughout a broad range of temperatures. The teachings of the instant invention are specifically applicable to the transportation and storage of liquefied hydrocarbons at cryogenic temperatures and shall be discussed for purposes of explanation primarily in this respect. It will become apparent, however, that the invention, as herein further described, may find applicability in many areas where there is a need for a high-strength efficient insulation material.

Liquefaction of hydrocarbon mixtures and their subsequent transfer by large tankers have greatly increased within the last decade. Of these hydrocarbon mixtures, natural gas is a prime example. This material is often found in areas remote to where it will ultimately be used and when separated from the point of utilization by a large body of water, economics dictate the bulk transfer of the natural gas by large tankers. Under these circumstances the natural gas must be liquefied so as to greatly reduce its volume. At atmospheric pressure the liquefied gas will be at extreme cryogenic temperatures (about —258° F.).

The insulation system of the instant invention is particularly adaptable for use in the tankers and at the temperature indicated above. It will be appreciated that both thermal as well as actual physical stress on any insulation system will be quite severe in this service and it is to meet such stresses that applicants' invention is directed.

SUMMARY OF THE INVENTION

According to the methods of the instant invention, a high-strength cellular plastic insulation system is formed by alternating cellular plastic with thin columns of solid plastic. Suitable plastics include polystyrene, polyethylene, polypropylene, polyvinyl chloride and the like. The solid plastic columns are formed by heat sealing blocks or planks or the cellular plastic together. While insulation systems employing cellular plastics are known in the art, per se, the insulation taught herein possesses distinct advantages over those presently known. As hereinbefore indicated, one of the requirements placed on the insulation to be used in cryogenic tankage is that it possess adequate strength to maintain its integrity under load conditions. In this regard the loading, such as on the floor or a container carrying liquid natural gas in a tanker, is about 75 pounds per square inch, including an adequate safety factor. In the past the most direct method for achieving cellular plastics (alternatively known as foamed plastics) of sufficient strength has been to use high density foams. However, as the density of the foamed plastics increases, the insulation value decreases and cost of the cellular plastic increases. By using the methods of the instant invention, it has been found possible to increase the load bearing capacity, shape retention and resistance to fatigue of low density foams (1 to 5#/ft.$^3$) without an appreciable decrease in their inherent insulation efficiencies.

The load carrying capacity of the plastic raw material in solid form used in the manufacture of cellular foams is very high. The compressive strength of the solid polymer being on the order of several thousand pounds per square inch. As hereinbefore mentioned, the load expected (including a safety factor) on the floor of a container in a tanker is about 75 pounds per square inch. To avoid or minimize the danger of fatigue failure, a cellular plastic carrying this load should have a compression strength of the order of 300 pounds per square inch. If the density of the foam were increased to the point where it had this compressive strength, its insulation efficiency would drop by a substantial percentage.

Thus, it is a specific object of this invention to provide a cellular insulation material which achieves high strength without a corresponding increase in its density or loss in its thermal insulation efficiency.

A further specific object of the invention is to provide methods whereby such an insulation material may be made.

Other objects and a fuller understanding of the invention may be had by referring to the following description and claims taken in conjunction with the accompanying drawings in which:

BRIEF DESCRIPTION OF THE DRAWINGS

FIG. 1 represents schematically one process for making the improved insulation of the instant invention.

FIG. 2 is a front elevational view of the insulation as it emerges from a process as depicted in FIG. 1.

FIG. 3 represents schematically an alternative process for making the improved insulation of the instant invention.

FIG. 4 shows a perspective view of a panel-type member employing the improved insulation.

DESCRIPTION OF THE PREFERRED EMBODIMENTS

Referring to FIG. 1 in detail, the initial step of the process shown therein is shown in step (A). Two planks or boards of the foamed plastic insulation materials 2 and 4 are fed into a conveying mechanism indicated generally at 7. Mechanism 7 comprises a pair of moving belt or other conveyor means, 6 and 10, and a center bearing means 8. Bearing means 8, which is stationary, is heated at its surfaces 9 and 11 by means of heater 13. Heater 13 may be of any suitable type such as electrical or steam heater and the surfaces 9 and 11 may be zone heated. That is, the temperature of these surfaces may be controlled so that they gradually increase to the point where they are at the heat sealing temperature required by the foam planks. To facilitate movement through the mechanism 7 and to prevent sticking, the plank surfaces 9 and 11 of bearing means 8 may be provided with a suitable coating such as a fluorocarbon polymer, for example, of the type sold under the trademark Teflon.

As the foam planks 2 and 4 advance through the mechanism 7, their interior surfaces make contact with surfaces 9 and 11 of bearing member 8 and are thus heated to the temperature required for heat-sealing. Upon exiting from mechanism 7, planks 2 and 4 enter a pair of converging guide means 12 and 14 from which they are fed into another conveying mechanism which is indicated generally at 15 in FIG. 1(B). In this mechanism the interior heat surfaces of planks 2 and 4 are brought together and, as a result, are heat-sealed to each other at the interface 3. It will be appreciated by those skilled in the art that the thickness of the interfacial bond layer 3 may be controlled by suitably adjusting the temperatures of heated surfaces 9 and 11 in FIG. 1(A), the speed of the conveyors 6 and 10, and by carefully controlling the amount of bonding pressure used. The latter factor can be controlled by suitable adjustment of the angle of convergence of guide means 12 and 14 and by controlling the spacing between conveying means 16 and 18 of FIG. 1(B). Thus, upon emerging from conveyor mechanism 15, as shown by the dotted portion of FIG. 1(B), the two planks 2 and 4 have been heat-sealed together at their interface 3. The thickness of the interfacial layer or web being controlled is indicated above.

Upon exit from mechanism 15 the bonded foam planks 2 and 4 are fed into another mechanism indicated generally at 17 in FIG. 1(C). This mechanism functions in a similar fashion to mechanism 7 of FIG. 1(A), the only difference being that the gap between the upper surface of the bearing means 22 and the lower surface of belt 20 is enlarged to a width whereby it may engage the two bonded planks 2 and 4. Upon passage through mechanism 17, the bottom surface of plank 4 and the upper surface of plank 30 are heated to the requisite temperatures. Upon exit from mechanism 17 combined planks 2 and 4 and plank 30 pass through another set of converging guide means indicated at 26 and 28 of FIG. 1(D). These planks then enter another conveying mechanism indicated generally at 37, where they are bounded together at their common interface in a fashion as indicated above. Here again, the thickness of the interfacial bond layer 32 may be controlled as hereinbefore discussed.

As will be readily understood by those skilled in the art, the process is continued in an identical fashion through a series of similar conveyor and bonding mechanisms, not shown, until a plurality of planks have been heat-sealed together. The final product of this bonding operation is illustrated by the schematic of FIG. 2.

Referring to FIG. 2 in detail, it is seen that the product of the bonding operation is a laminate construction comprising a plurality of foam planks 2 and 30, for example, bound together by a plurality of webs 3 and 32, for example. The final step of the process involves a cutting operation (not shown) wherein the laminate of FIG. 2 is cut along lines A—A, B—B and C—C, for example, into a series of slabs of thickness t, for example. These slabs are then made up into panels or the like as indicated in FIG. 4.

FIG. 3 depicts an alternative to the process of FIG. 1. In this embodiment the starting material is a much thicker block of thermoplastic cellular material 40. Block 40 is supported on a suitable supporting surface 43. A downward force is applied on the top of block 40 by a suitable loading indicated schematically by the weight 46. A plurality of heated cutting wires 44 extending in a plane substantially perpendicular to the drawing are supported by support means (not shown) above surface 43 and to the right of block 40.

An advancing means 48, defining a plurality of slots 50 designed to clear the wires 44, is used to advance block 40 along the surface 43 and through the plane defined by the wires 44 whereby the block 40 is cut into a series of slabs 52. These slabs are subsequently reunited at their interfaces 51, under the influence of the weight 46, as the material which has been melted by the wires 44 fuses upon cooling. Here again it will be appreciated by those skilled in the art that the thickness of the interfacial layers may be readily controlled by suitably adjusting the temperature of the cutting wires 44, the loading represented by the weight 46, and the speed at which block 40 is advanced through the wires 44. While, for the sake of discussion, only two wires have been illustrated, it is to be understood that the process is not limited as to the number of wires used. Thus, the product 54 of the process of FIG. 3 will be substantially similar to the laminate shown in FIG. 2 and like that product may be made into panels as indicated in FIG. 4.

FIG. 4 shows a panel which incorporates the insulation made according to the teachings hereinbefore detailed. The core 42 of the panel comprises a slab of the laminate hereinbefore described, which is made of a series of foamed plastic sections bound together by a series of web-like columns 3 and 32, for example. If desired, protective skins to distribute loadings may be adhered to the core 42 at 41 and 45 by a suitable adhesive. Thus, as a load P (parallel to the webs) is applied, it is for the most part uniformly carried in compression by the web-like columns. It will be appreciated by those skilled in the art that to achieve the optimum performance from a thin column, it is imperative that the columns be prevented from buckling. As may readily be seen, the methods of the instant invention result in a system wherein the thin columns are maintained in substantially perfect alignment and are laterally supported by the foam sections immediately adjacent thereto. Of further significance is the fact that the use of a separate adhesive between the various foam sections and web-like columns is completely avoided in the embodiments hereinbefore detailed. At cryogenic temperatures the thermal behavior of an adhesive might be different than that of the plastic composing the foam. This might cause difficulty in the way of separation and subsequent buckling of the columns. The instant insulation avoids any such difficulty because its web-like columns are composed of the same plastic as is the foam insulation. This is to say, the heat-sealing operation melts the foam surface, destroying its cellular characteristics while forming the webs which are then, of course, composed of the solid plastic.

Although a prime objective of the instant disclosure has been to provide a new and improved thermal insulation material and a method of making the same, it is to be appreciated that the teachings hereinbefore discussed could find use in other areas; for example, the apparatus of the instant invention could be employed to excellent advantage in the packaging field.

Although the above embodiments of the instant invention have been described with a certain degree of particularity, it is to be understood that the present disclosure has been made by way of example and that obviously changes in the methods of construction and arrangement of various components may be resorted to without departing from the spirit of the disclosed teachings.

Thus, for example, while the invention has been described with reference to materials which may be readily heat-sealed, polystyrene or polyethylene foams, for example, other materials may also be fabricated into an insulation material of the type described. In this regard thermosetting polymer such as foamed polyurethane, for example, may be made up into an insulation slab as taught herein by use of a suitable adhesive. This adhesive should be selected so as to possess the same or very similar thermal coefficients of expansion, as does the foam plastic employed. Thus, for polyurethane foams, a polyurethane adhesive would be indicated. It will also be apparent that the material composing the webs and foam need not necessarily be the same. Thus, where temperature ranges and/or loadings are less severe, other material may be used for the web-like columns. For example, webs of paper or the like may be suitably employed under less severe conditions.

Accordingly, for the full scope of the instant invention, reference should be made to the following appended claims.

What is claimed is:
1. A load-bearing thermal insulation comprising:
   (a) a plurality of adjacent blocks of insulating foamed plastic material having their adjacent surfaces aligned parallel to the compressive stress applied by the load;
   (b) thin web-like columns between each pair of adjacent surfaces of said blocks and integral therewith, said columns being of the same material as the insulating plastic foam blocks and having been formed therefrom by melting a portion of the said adjacent surfaces.
2. The load-bearing insulation of claim 1 further comprising a protective skin overlaying said insulating blocks whereby said load is distributed uniformly over said blocks and said columns.
3. A load-bearing thermal insulation comprising:
   (a) a plurality of adjacent blocks of insulating foamed plastic material having their adjacent surfaces aligned parallel to the compressive stresses applied by the load.
   (b) thin web-like columns between each pair of adjacent surfaces of said blocks, said columns composed of an adhesive having a similar thermal expansion coefficient to that of the insulating plastic foam blocks.
4. The load-bearing insulation of claim 3 further comprising a protective skin overlaying said insulating blocks whereby said load is distributed uniformly over said blocks and said columns.

References Cited
UNITED STATES PATENTS

| | | | |
|---|---|---|---|
| 2,660,194 | 11/1953 | Hoffman | 161—159 X |
| 3,339,326 | 9/1967 | Derr et al. | 161—38 X |
| 3,567,536 | 3/1971 | Wickersham, Jr. | 161—159 X |

PHILIP DIER, Primary Examiner

U.S. Cl. X.R.

156—159, 256; 161—39, 159; 220—9